United States Patent [19]
Lecordier

[11] 3,956,995
[45] May 18, 1976

[54] METHOD AND APPARATUS FOR MAINTAINING THE AXIAL ALIGNMENT BETWEEN A TUBE AND A MACHINE MOVABLE THEREIN

[76] Inventor: Michel G. Lecordier, "Le Parc" -Blvd. Pomeon, 13009 Marseille, France

[22] Filed: Nov. 7, 1974

[21] Appl. No.: 521,830

[30] Foreign Application Priority Data
Nov. 7, 1973 France .............................. 73.39501

[52] U.S. Cl. .......................................... 104/138 G
[51] Int. Cl.² ........................................ B61B 13/10
[58] Field of Search ................... 104/138 R, 138 G; 105/365; 267/34; 33/1 H, 178 F; 73/40, 40.5 R, 40.5 A; 138/103, 178

[56] References Cited
UNITED STATES PATENTS

| | | |
|---|---|---|
| 3,251,136 | 5/1966 | Tyrrell et al...................... 33/178 F |
| 3,400,574 | 9/1968 | Cramer............................ 33/1 H X |
| 3,598,422 | 8/1971 | Strauff............................ 267/34 X |
| 3,734,428 | 5/1973 | Alexandrov et al......... 104/138 R X |

*Primary Examiner*—Robert J. Spar
*Assistant Examiner*—Randolph A. Reese
*Attorney, Agent, or Firm*—Sughrue, Rothwell, Mion, Zinn and Macpeak

[57] ABSTRACT

To maintain centering of the axis of a machine movable along a tube and rotatable relative to the tube, the machine is associated with a weight compensating device which provides a weight compensation sufficient to compensate for the weight of the machine regardless of the attitude of the machine in the tube. The device comprises at least one closed chamber for liquid and communicating with at least three radially extending, equally angularly spaced cylinders and pistons, the pistons of which are fixed to the chamber and the cylinders of which carry rollers bearing against the wall of the tube.

13 Claims, 4 Drawing Figures

METHOD AND APPARATUS FOR MAINTAINING THE AXIAL ALIGNMENT BETWEEN A TUBE AND A MACHINE MOVABLE THEREIN

FIELD OF INVENTION

The invention relates to a method of preserving the alignment of the axis of a machine relative to the axis of a tube in which the machine moves and to a device for compensating for the weight of the machine.

BACKGROUND OF THE INVENTION

When a machine travels inside a tube, bearing against the walls of the tube by means, for example, of rollers, its motion is affected by deformations in the tube. In order to avoid successive impacts at abrupt variations in the surface of the walls, radial movements of the machine are damped by suitable means, for example, a spring. However under the effect of the weight of the machine, the springs lying underneath it are compressed, so that if springs are selected so that the axis of the machine coincides with that of the tube in a certain attitude of the machine, rotation of the machine about its axis will bring about a variation in the forces applied and hence a displacement of the axis of the machine with respect to the axis of the tube.

A displacement of this kind may be troublesome, particularly because of the risk of friction between one portion of the machine and the wall of the tube or even a risk of impact in certain cases, because of oscillations produced by differences in level, which could cause the undesired release of a control device on the machine. The movable machine may for example, bear a gauging device having the function of triggering plugging of the tube in which it is moving and consequently of triggering locking the machine onto the wall of the tube, upon the detection of a contraction of a certain value in the diameter of the tube.

SUMMARY OF THE INVENTION

It is an object of the invention to alleviate these disadvantages by addition to the machine of a device the reaction of which against the wall of the tube compensates for the weight of the machine. In this way the alignment of the axis of the system is preserved, thereby avoiding the disadvantages previously pointed out, particularly in the event of rotation of the machine about its own axis.

Thus it is sufficient, to make the axis of the machine coincide with the axis of the tube, to use the machine as bearer of any required checking device and arrange it so that its axis coincides with that of the weight-compensation device which is suitably centered on the axis of the tube. The level of the axis of the machine is thus maintained constant and in this way any accidental friction or impact of the machine with the tube during its travel along any portion of the tube, the variations in diameter of which do not exceed a certain amplitude, are avoided regardless of the angular position of the machine or of the weight-compensation device relative to the tube.

The combination of a weight-compensation device and the machine which is the bearer of any required checking device can offer further the advantage of not requiring the mounting of skids or bearer rollers on the body of the machine, thus leaving open the possibility of adding to the machine any required type of detector. Being no longer subjected to variations in its distance from the walls of the tube, that is, variations produced because of the weight of the machine deforming the compensation springs as a function of its attitude round the axis of the tube, the detector can function with accuracy when it is a question, for example, of detecting variations in diameter of the tube, which are greater than a predetermined amplitude.

The invention will be more clearly understood from the following description of an embodiment thereof, given by way of example only, with reference to the accompanying drawings.

DETAILED DESCRIPTION OF PREFFERRED EMBODIMENT

Figure 1:
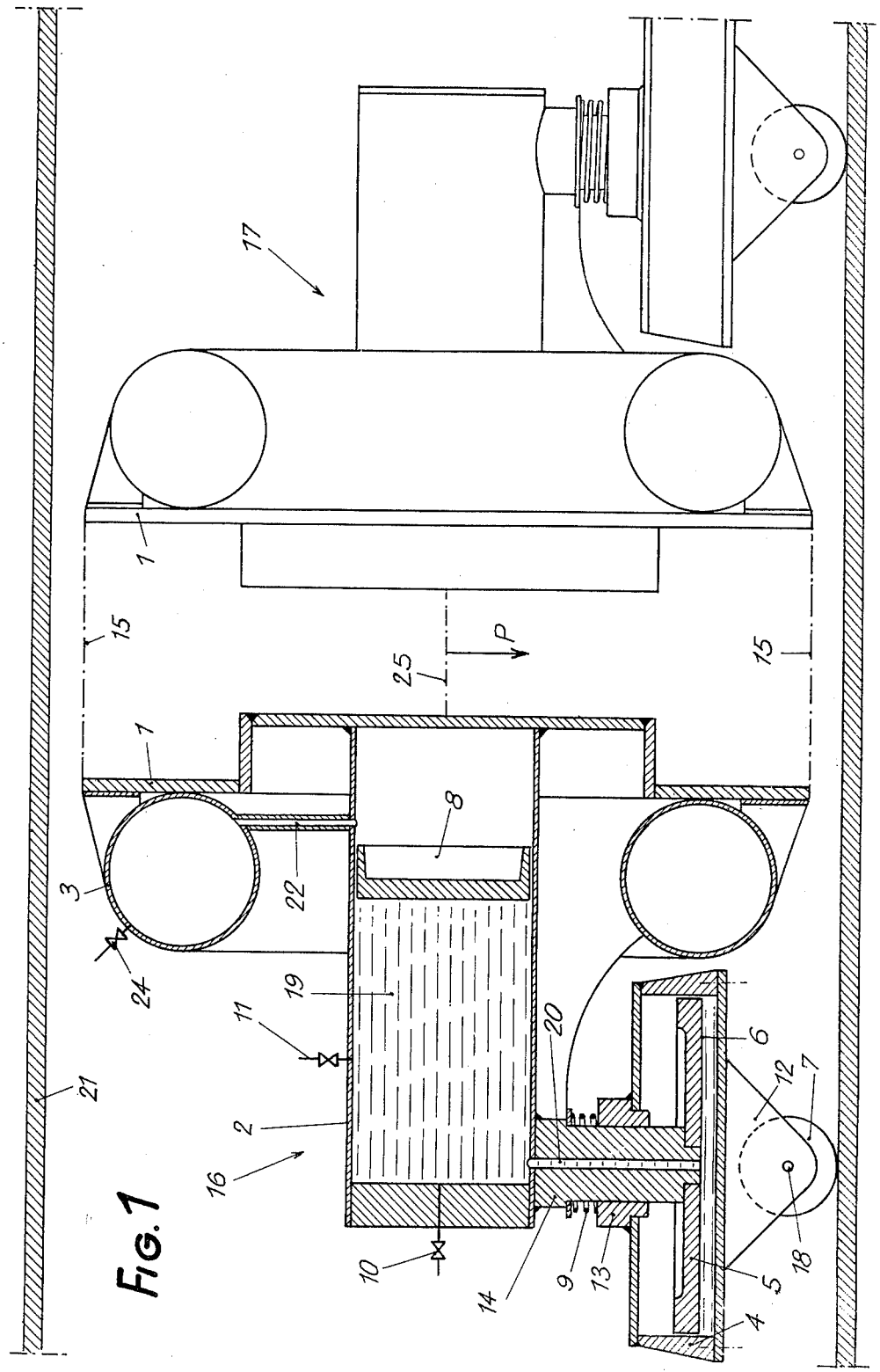
FIG. 1 illustrates partially in section an embodiment of a device for compensation of the weight of a machine for checking and control.

As shown in FIG. 1, in order to keep quite general the representation of the machine it has been indicated symbolically by the space bounded by supporting plates 1 and the dash-dot lines 15. Thus it will be understood that the machine may be any device, for example, a device for verification of the gauge of a tube, which is capable of locking itself against the walls of the tube under predetermined conditions which are detected automatically by the verification device. As shown the machine is fixed to two similar portions 16 and 17 constituting a weight-compensation device.

Depending upon the function of the machine it may be detachably fixed or welded to the supporting plates 1 of the device 16–17. If the machine is to remain in a certain attitude, e.g. vertical, the machine may be mounted by means of shafts resting on bearing means provided on each of the portions 16 and 17 of the device. But whether it is a matter of rigid fixed mechanical connections or connections by trunnions, the combination of the machine with a weight-compensation device to be dscribed hereafter enables preservation of the level of the axis of the machine and of the compensation device whatever the attitude of the latter on rotation about its axis.

Figure 2:
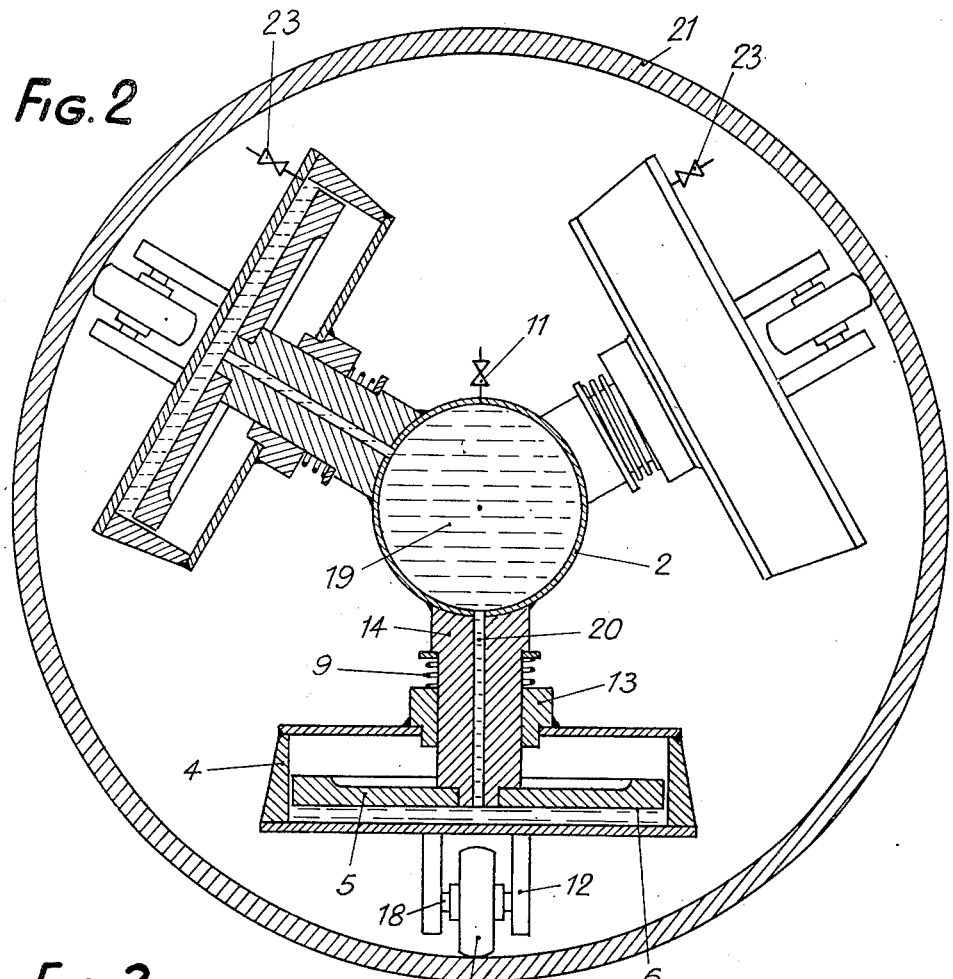
FIG. 2 is a transverse section through the device of FIG. 1, perpendicular to the axis of the device.

Each portion of the compensation device comprises a cylinder 2 fast with the supporting plate 1 and at least three rods 14 to which are fixed three pistons 5, see FIGS. 1 and 2. Each piston 5 moves in a cylinder 4 carrying a fork 12 supporting the axle 18 of a roller 7. One chamber of the cylinder 2 contains a liquid 19 of high bulk density, for example, mercury, and is in connection, through a channel 20 in each rod 14, with that chamber of the cylinder which is defined in part by the face 6 of the piston 5. The body of the cylinder 4 is fast with a slide block 13 which slides on the rod 14. A spring 9 bearing against the slide block 13 and against a shoulder on the rod 14 exerts a predetermined force tending to apply the roller 7 to the wall of tube 21 by means of the cylinder 4. Keying means (not shown) prevents rotation of the cylinder 4 about the axis of the rod 14. A free piston 8 keeps the liquid 19 in the cylinder 2 under the pressure of a compressible fluid, for example compressed air, in a tank 3 which communicates through channel 22 with that chamber of the cylinder 2 adjacent the supporting plate 1.

In order to facilitate filling of each cylinder 2 with mercury the compensation device can be brought into the position illustrated in FIG. 2 and the mercury introduced through valve 23. The mercury flows into the lower cylinder 4 under gravity. For this purpose care is taken to purge the air from the system by opening the purging valves 11. During this operation the piston 8 is kept in contact with the mercury by overpressure of compressed air introduced through the valve 24. After filling, the pressure of the compressed air is brought to an equilibrium pressure with the mercury or to a slightly higher pressure.

It is easy to demonstrate that a compensation device as described, acted upon by the weight P of the machine and by the reactive forces acting upon the faces 6 of the pistons of the compensation device 16–17, can be in a state of equilibrium whatever the attitude of the system about its axis 25.

Figure 3:
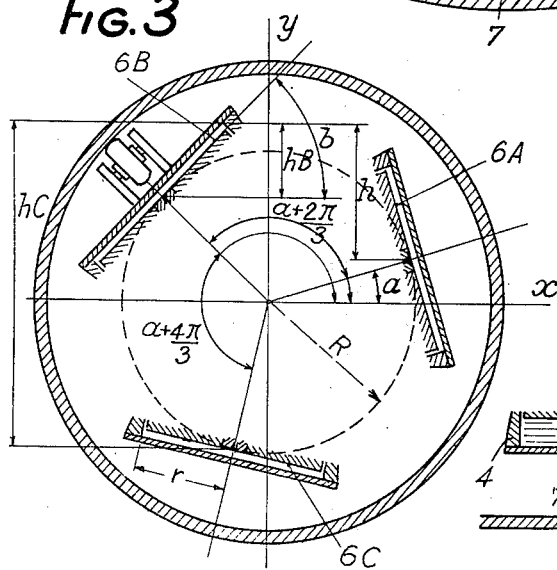
FIG. 3 is a diagrammatic view of the ends of the pistons of the device of FIG. 1 in any position of rotation about its axis.
Figure 4:
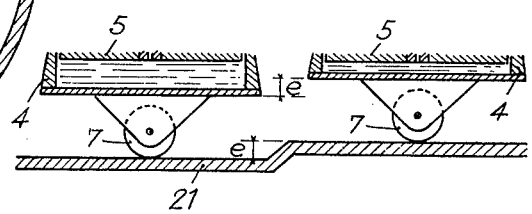
FIG. 4 diagrammatically represents the variation in volume of the chamber of a cylinder of the device of FIG. 1 during a variation in diameter of the guide tube.

Simple study of FIG. 3 shows in short that the moduli of the forces $F_A$, $F_B$ and $F_C$ exerted on the pistons $6_A$, $6_B$ and $6_C$ are equal to $F_n = dg\, Sh_N$, where $d$ is the bulk density of the mercury, g the acceleration due to gravity, S the area of the piston and $h_N$ the height of the column of mercury above the center of the piston $6_N$.

$$h_N = \left[ R\sin\left(a + \frac{2\pi}{3}\right) + r\sin b \right] - R\sin\left(a + \frac{2n\pi}{3}\right).$$

with $n = 0$ for N = A, $n = 1$ for N = B and $n = 2$ for N = C.

Thus for each force the modulus is equal to the difference between two terms, the first term being the same whatever N is. The directions of the forces are mutually inclined at 120° so that the vectorial sum of the forces corresponding with this first term is zero.

The horizontal projections onto the axis $ox$ and the vertical projections onto the axis $oy$ of the forces corresponding to the second term are respectively:

$$F_x = -F_A\cos a - F_B\cos\left(a + \frac{2\pi}{3}\right) - F_C\cos\left(a + \frac{4\pi}{3}\right) \text{ and}$$

$$F_y = -F_A\cos a - F_B\cos\left(a + \frac{2\pi}{3}\right) - F_C\cos\left(a + \frac{4\pi}{3}\right)$$

whence:

$$F = \left[ dgSR\ \sin a\cos a + \sin\left(a + \frac{2}{3}\right)\cos\left(a + \frac{2}{3}\right) + \sin\left(a + \frac{4\pi}{3}\right)\cos\left(a + \frac{4\pi}{3}\right) \right]$$

or $$F = \tfrac{1}{2}dgSR\left[ \sin 2a + \sin\left(2a + \frac{2\pi}{3}\right) + \sin\left(2a + \frac{4\pi}{3}\right) \right].$$

The last factor being zero since it represents the sum of the sines of the angles of an equilateral triangle, it can be seen that the system is subjected only to the action of the vertical component:

$$F_y = dgSR\left[ \sin^2 a + \sin^2\left(a + \frac{2\pi}{3}\right) + \sin^2\left(a + \frac{4\pi}{3}\right) \right] \text{ or}$$

$$F_y = \frac{3}{2}dgSR.$$

In short, the system is subjected to a first vertical force equal to (3/2) dg SR exerted upwardly against the portion 16, to an identical force exerted against the portion 17, and to the weight P of the machine. It is therefore sufficient to select as the value of S that which satisfies the equation P = 3 dg SR, to keep the system in equilibrium whatever the value of the angle $a$.

When the system is being driven into a zone of the tube in which the diameter decreases by an amount 2e, each roller 7 moves a distance e so that a corresponding volume of mercury equal to eS is driven into the cylinder. The total volume 3eS brings about displacement of the piston 8 in the direction of the compressed air reservoir. In order to make the variation in pressure in the tank 3 negligible, a ratio is selected between the volumes of the capacities containing the air and the mercury such that the variations in pressure resulting from variations in the volume of the mercury as a result of passing from one zone of the tube to another is of the order of only 10%. For this purpose the tank 3 may have a capacity 10 times greater than the volume of the mercury. The increase in pressure resulting from passage of the machine through a smaller section of tube is moreover distributed over each of the three rollers of each portion of the compensating device.

In as much as the system is subject to no resultant radial forces because of the compensation of the weight of the machine, the system would remain in near-equilibrium whatever its decentering in the absence of the springs 9. Their calibration depends upon the stability required and the frictional forces tolerated.

It is clear that numerous changes may be applied to the embodiment described above without departing from the scope of the invention as defined by the appendent claims. For example the machine may be composed of two portions which may be mounted on opposite sides of a compensation device which may then consist of a single portion 16 in which each cylinder 4 is coupled to at least two rollers 7 spaced apart longitudinally in order to preserve parallelism between the axes of the machine and the tube. Similarly a machine having a single portion may be overhung from a compensation device having a single portion of this type.

What is claimed is:

1. A method of maintaining the level of the axis of a machine relative to the axis of a tube in which the machine moves, comprising the steps of;
    a. attaching at least one chamber to said machine
    b. supporting said chamber inside the tube on three angularly spaced apart support points, and
    c. placing a heavy liquid mass in said chamber such that said heavy liquid mass causes said spaced apart points to exert a force against said tube to compensate for the weight of the machine.

2. A method as claimed in claim 1, in which compensation of the weight is obtained by varying least one of the following parameters: the bulk mass of said heavy liquid, the area of the surface upon which the reaction due to said liquid is exerted, and the distance of said surface from said axis of said tube.

3. A method as claimed in claim 2, comprising the additional step of attaching two chambers to said machine wherein the machine has a weight P and is subject to the reaction of two forces of values -P/2 by dividing said liquid mass into two equal portions contained within two closed chambers, said reaction against said tube wall being effected for each of said portions by a set of at least three rollers equally angularly spaced apart.

4. A method as claimed in claim 1, wherein the spaced apart support points are oriented such that at least three support forces converge on the axis of said tube to maintain coincidence of said axis of said machine with said axis of said tube.

5. A device for maintaining the level of the axis of a machine relative to the axis of a tube in which the machine moves, comprising, a weight compensation device having a closed chamber for liquid and having an axis oriented parallel to the axis of the tube; at least three movable cylinders whose axes entend radially of said chamber; a piston located in each of said movable cylinders and slidable with respect thereto; at least three piston rods fixed to said chamber and said pistons, and each slidable in one of said movable cylinders, said piston rods having a passage therethrough to communicate said chamber with one side of said piston; said piston rods and cylinders being equally angularly spaced apart, at least one roller attached to each of said movable cylinders and bearing against the wall of the tube; and means for supporting a machine centered on said axis of said chamber.

6. A device as claimed in claim 5, further comprising a free piston located in said chamber, said free piston delimiting the volume of said chamber to be filled with a compressible fluid such that the pressure of said compressible fluid against said free piston will maintain liquid in each of said cylinders.

7. A device as claimed in claim 5 wherein said liquid is mercury and said compressible fluid is compressed air.

8. A device as claimed in claim 5, wherein each cylinder includes a slideblock in which the piston rod slides; and a spring which bears against a shoulder on said rod and urges said cylinder in a direction to apply its roller against the wall of the tube.

9. A device as claimed in claim 5, wherein said weight compensation device includes two coaxial closed chambers, each having equally angularly spaced piston, piston rods, and cylinders bearing rollers, and means to fix the machine between the two chambers of said weight compensating device such that its axis coincides with that of said chambers.

10. A device as claimed in claim 5, wherein said weight compensating device includes two coaxial closed chambers each having equally angularly spaced pistons, piston rods and cylinders bearing rollers, and means to rotatably mount said machine between the two chambers of said weight compensating device such that its axis coincides with that of said chambers.

11. A device as claimed in claim 5, wherein each cylinder has two rollers which are aligned and spaced apart sufficiently to ensure stability of said device.

12. A device as claimed in claim 11 wherein the machine is composed of two portions mounted on each side of said weight compensation device.

13. A device as claimed in claim 11, wherein the machine is mounted on one side of said weight compensating device so as to overhang said device.

* * * * *

UNITED STATES PATENT AND TRADEMARK OFFICE
CERTIFICATE OF CORRECTION

PATENT NO. : 3,956,995
DATED : May 18, 1976
INVENTOR(S) : Michel G. LECORDIER

It is certified that error appears in the above-identified patent and that said Letters Patent are hereby corrected as shown below:

In the Heading:

The Assignee's names were omitted, should read:
Assignee: Compagnie Francaise Des Petroles,
Societe Anonyme
Etudes Petrolieres Marines
Ateliers Et Chantiers De Bretagne-A.C.B.
Compagnie Maritime D'Expertises
Compagnie Generale Pour Les Developpements
Operationnels Des Richesses Sous-Marines
(Doris) Paris, France --.

Column 3, line 55, following "F=", delete "[";

line 55, following "dg SR", insert -- [ --.

IN the Claims:

Column 4, line 64, following "varying", insert --at--.
Column 6, line 3, delete "5" and insert -- 6 --.

Signed and Sealed this

Seventeenth Day of January 1978

[SEAL]

Attest:

RUTH C. MASON
Attesting Officer

LUTRELLE F. PARKER
Acting Commissioner of Patents and Trademarks